United States Patent [19]

Tu Xuan

[11] Patent Number: 4,467,255
[45] Date of Patent: Aug. 21, 1984

[54] POSITION DETECTOR FOR A STEPPING MOTOR

[75] Inventor: Mai Tu Xuan, Chavannes, Switzerland

[73] Assignee: Societe Suisse Pour L'Industrie Horlogere Management Services S.A., Bienne, Switzerland

[21] Appl. No.: 357,954

[22] Filed: Mar. 15, 1982

Related U.S. Application Data

[63] Continuation of Ser. No. 165,873, Jul. 3, 1980, abandoned.

[30] Foreign Application Priority Data

Jul. 9, 1979 [FR] France .................................. 79 18170

[51] Int. Cl.³ .............................................. G05B 19/40
[52] U.S. Cl. ..................................... 318/696; 368/157
[58] Field of Search ............... 318/685, 696, 138, 254, 318/439; 368/157, 76

[56] References Cited

U.S. PATENT DOCUMENTS

| | | | |
|---|---|---|---|
| 3,475,667 | 10/1969 | Newell | 318/696 |
| 4,032,827 | 6/1977 | Dobratz | 318/696 |
| 4,205,262 | 5/1980 | Shida | 318/696 |
| 4,208,868 | 6/1980 | Regneir | 318/696 X |
| 4,241,433 | 12/1980 | Ueda et al. | 318/696 X |
| 4,274,150 | 6/1981 | Ikenishi et al. | 368/76 X |
| 4,346,463 | 8/1982 | Tu Xuan et al. | 318/696 |
| 4,361,410 | 11/1982 | Nakajima | 318/696 X |
| 4,370,065 | 1/1983 | Kawamura et al. | 318/696 X |
| 4,371,821 | 2/1983 | Laesser et al. | 318/696 |

Primary Examiner—B. Dobeck
Attorney, Agent, or Firm—Griffin, Branigan & Butler

[57] ABSTRACT

The invention provides a feed arrangement enabling the detection of the rotor position of a stepping motor in relation to polarity of the motor pulses and to apply a series of long duration pulses should the polarity be considered to be wrong. The detector includes means for sampling the induced voltage generated by the motor at a predetermined moment the motor being then open circuited, comparing said voltage with a reference signal and using the result of the comparison to determine whether or not the long duration pulses should be applied to the motor. The invention is intended for use with micromotors as used in timepieces.

5 Claims, 10 Drawing Figures

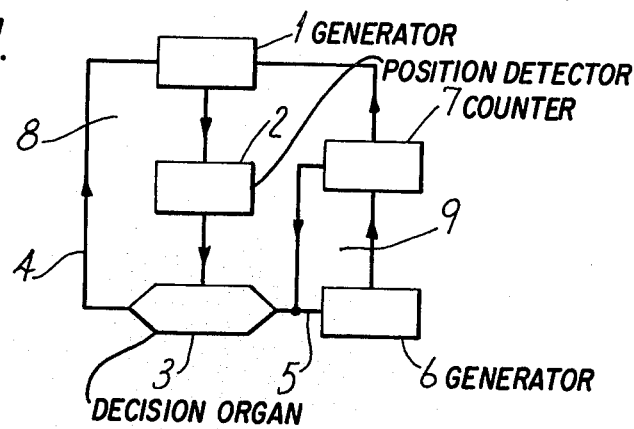
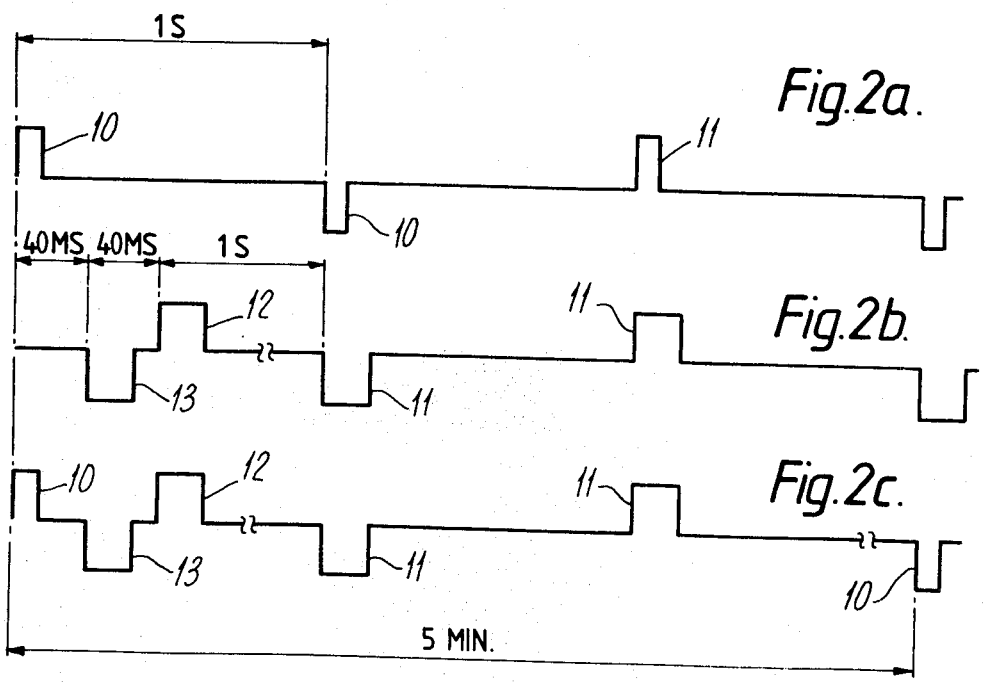

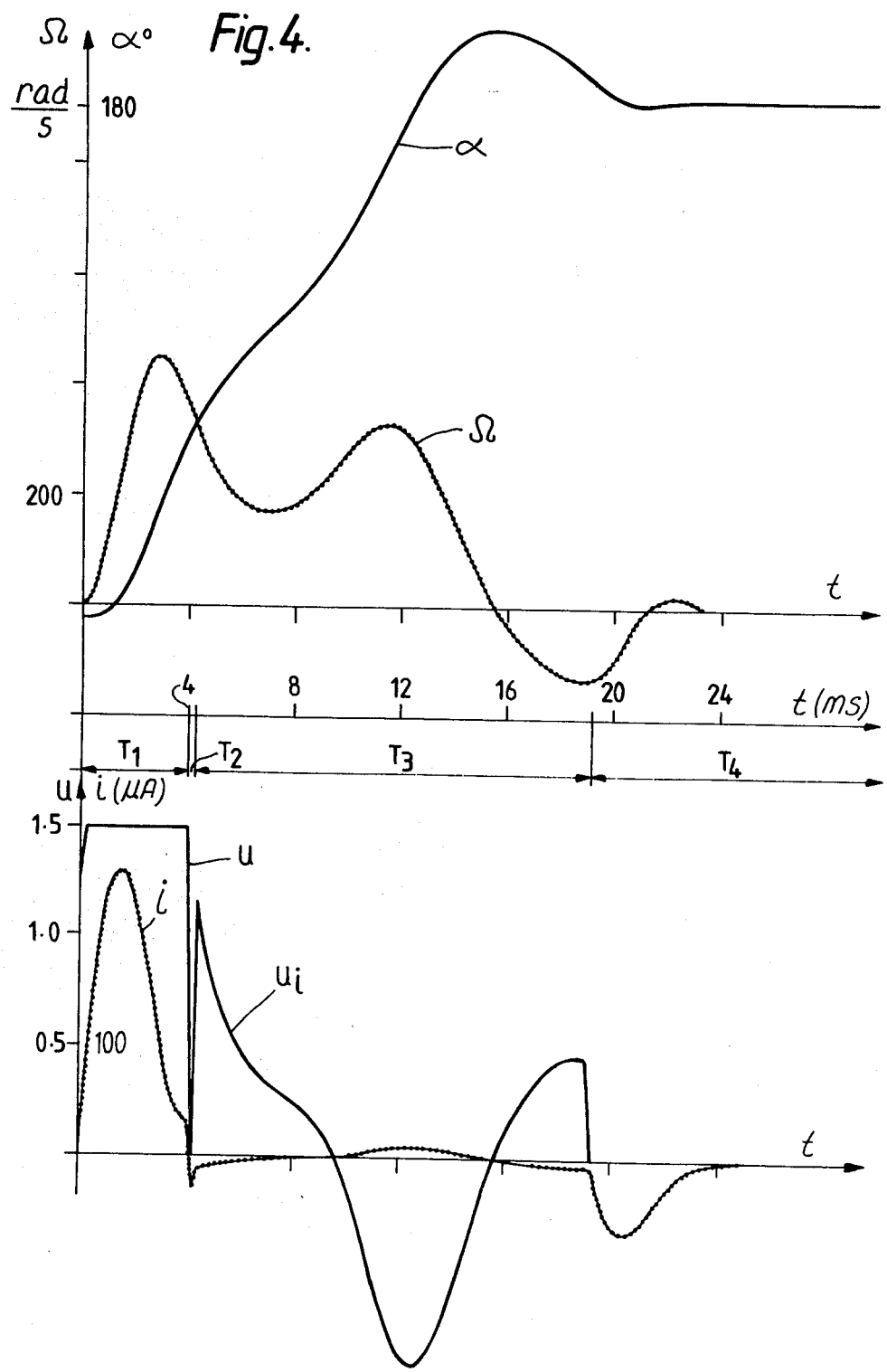

POSITION DETECTOR FOR A STEPPING MOTOR

BACKGROUND OF THE INVENTION

This is a continuation of application Ser. No. 165,873, filed July 3, 1980, now abandoned.

The object of the present invention is to provide a feeding method enabling detection of the movement of a single phase stepping motor as used for instance in a timepiece, and arranged to control the operation of the motor by supplying a first type of bipolar pulses of short duration or by supplying a second type of bipolar pulses of greater duration, each of the said types of pulses of the first or the second type being separated by the same predetermined time interval, a pulse train of the second type being applied to the motor in the event that such motor receives a pulse having a polarity such that it could prevent the stepping thereof responsive to a pulse of the first type.

Stepping motor feed methods are already known. The German laid open specification DEOS No. 27 45 052 describes a control system which supplies the motor with a low energy signal if the motor load is low and a greater energy signal if the motor load is heavy and does so with the purpose of diminishing by approximately 60% the energy consumption of the timepiece. The device operates by transforming from the first type of signal to the second type of signal on determining the motor current curve from the peak of which is displaced towards the right when the motor load increases. Through detecting the position of the maxima it thus becomes possible to send to the motor a wide pulse, for instance 7.8 ms, whenever the mechanical moment increases, this being the case for example whenever the calendar date should be changed. Such a system is however incapable of detecting, following such wide pulse, whether or not the motor has advanced through a step. There may thus be circumstances where a series of pulses of greater width has been sent to the motor unnecessarily.

Other control arrangements have been proposed which detect whether or not the motor has stepped in response to a pulse. Such is the case for example in French patent applications FR No. 2 384 289, FR No. 2 388 323 wherein the motor arrangement is such as to present a saturable zone. In these circumstances a detection pulse having on the order of one ms width enables detection of whether or not the rotor has turned. If the step has not been made a correction pulse (for instance 7.8 ms) is immediately sent to the motor and replaces the normal advancing pulse (3.9 ms). As already mentioned such a system requires a motor having a saturable zone and thus present the difficulty of not always being applicable to every motor used within the industry. On the other hand it may be noted that the detection voltage is doubled whenever the motor makes its step. The present invention proposes a voltage difference much greater and this provides a greater security of operation as will be explained hereinafter. Still other systems are known which utilise the voltage induced or counter EMF supplied by the rotor winding in order to determine on the one hand if the rotor has stepped and on the other hand to provide additional energy if such is not the case.

The British specification GB No. 2,006,995 describes as known such a system where the induced voltage generated by the movement of the rotor is detected following each stepping pulse. If this voltage is low one concludes therefrom that the rotor has not stepped and a pulse having a duration longer than the normal is applied to the motor winding, following which once again the induced voltage level is measured. If the level is above a predetermined threshold the normal train of pulses is restored. Since the induced voltage is generally detected at a predetermined moment following each stepping pulse the question arises of fixing this time in order that it occurs at the same moment following a normal short pulse as in the case of a longer duration pulse. A compromise is difficult to realise since if this time is chosen to be sufficiently long to avoid overlapping by the long pulse the voltage detected following a short pulse may fall below the critical threshold even although the rotor has made its step. Consequently a long pulse may be applied to the motor unnecessarily (not voltage $U_i$ of FIG. 4 of the present case). To overcome this difficulty the cited patent specification suggests an arrangement employing a special circuit utilising the voltage induced by the motor and producing modulated control pulses, a solution which is totally different from that about to be described.

The U.S. Pat. No. 4,158,287 further describes the control of a stepping motor from the induced voltage supplied by the motor winding. Here as elsewhere in the case just cited and generally in all servo mechanisms an output signal is produced when the induced voltage drops below a predetermined value this having the effect of applying larger width pulses to the motor in order to assist it to overcome an increased couple.

In the arrangements suggested by two documents last cited there is detected whether or not the motor has made its step. If such is not the case there is applied to the winding a correction pulse. However herein there is the problem of determining the instant when the detection must be made, as mentioned previously, if unnecessary corrections are to be avoided. Moreover if the detection is effected in the proximity of the position of stable equilibrium of the rotor the difference in amplitude between the induced voltage produced if the rotor has stepped and that produced if the rotor has not stepped may be insufficient in order to decide whether or not the correction should take place. Effectively if the step has been made the rotor oscillates with a substantial amplitude about its new position before settling down. If the step has not been made the rotor has nevertheless been urged in its forward direction and thereafter returns to oscillate with a certain amplitude in its beginning position before settling down. It will be understood thus that if the increment of the load is just sufficient to prevent the step of amplitude of oscilation, thus the value of the induced voltage at the initial position, may be of the same order of magnitude as that existing at the new position if the rotor has in fact stepped.

SUMMARY OF THE INVENTION

It is the purpose of this invention to eliminate the difficulties previously mentioned and to base the detection of the rotor stepping not through detecting whether or not the rotor has stepped or whether the load has varied but to base such detection on the polarity of the motor pulse relative to the position of the rotor. Thus, as will be subsequently explained in detail, if the rotor has not made a step following application of a motor pulse of a correct polarity it will receive, following a predetermined time period, a new pulse of incorrect polarity and it is at this moment that the system comes into play, the correction being operated by applying two closely spaced pulses to the motor, these pulses being of longer duration, and following thereafter a series of larger width pulses. It may therefore be observed that none of the previously cited systems describes such an arrangement.

A further purpose of the invention is to provide a detection method based on the reading of the induced voltage furnished by the motor when open circuited immediately following a drive pulse.

Still a further purpose is to provide a control method which saves energy from the source thereof while at the same time is reliable in its operation. Such purposes are attained by the claimed method.

BRIEF DESCRIPTION OF THE DRAWINGS

FIG. 1 is a black diagram of a feed system having position control.

FIGS. 2a, 2b and 2c represent the various signals applied to the motor.

FIG. 4 shows the angular position $\alpha$, the angular velocity $\Omega$, the current in the winding i and the voltage at the terminals of the motor winding if the motor has received a proper advancing pulse.

DETAILED DESCRIPTION OF THE INVENTION

Figure 3A:
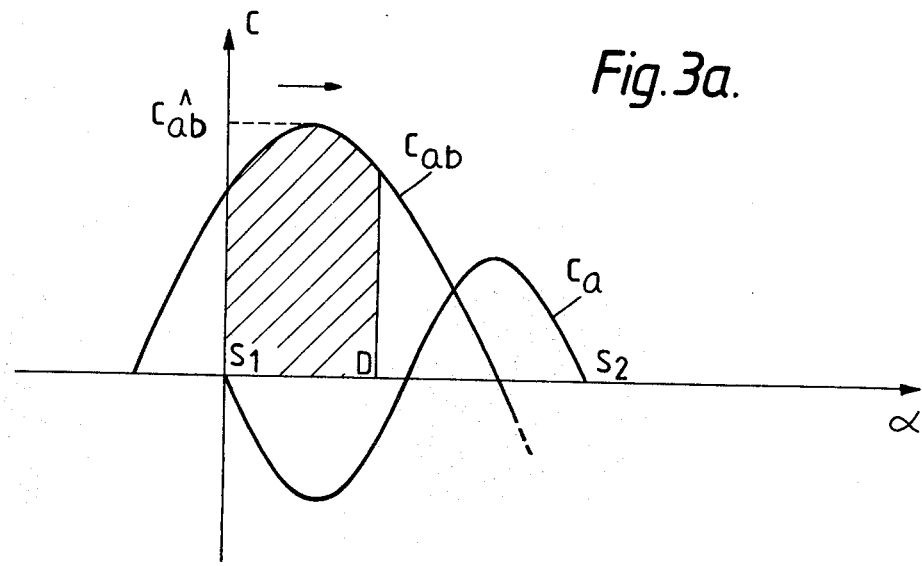
FIGS. 3a and 3b show the form of the mutual couple and positioning couple of the motor according to whether the winding receives the correct pulse or an accidental inverted pulse.

The invention now to be described aims at a reduction of current consumption by a timepiece motor. It has been determined that a micromotor for a watch works for the most part with practically no load. At the same time to assure a satisfactory functioning under special conditions as for instance temperature variations, exterior magnetic fields, shocks, angular accelerations, etc., it is found necessary to overfeed the motor, this leading to purposeless consumption of battery energy. This invention proposes a new method for determining the position of the motor rotor which enables the adaptation with suitable safety margins of feeding of the motor as a function of the load, from whence there results a considerable improvement in the energy consumption.

FIG. 1 shows the principle of feeding of a motor such as has already been mentioned in some of the above cited patents and a feeding diagram with determination of the rotor position. The motor is normally fed by short duration pulses (for example 4 ms) supplied by generator 1. A position detector 2, which will be described in greater detail further on, enables one to determine whether or not the rotor is positioned to receive a pulse of the correct polarity to continue its advance. In the affirmative the decision organ 3 informs generator 1 via line 4 that it must continue to feed the motor. In the negative the same decision organ controls generator 6 via line 5 so as to provide long duration pulses (for example 8 ms) which feed the motor and which are substituted for the short duration pulses. This substitution takes place during a period of n seconds determined by counter 7. Following this lapse of time, the motor is once again fed by short duration pulses. It is seen that the motor is alternatively fed and in accordance with its needs either by loop 8 giving short duration pulses, the detector being in operation, or by loop 9 giving pulses of long duration during a period determined by the counter, the detector being out of the circuit. The different anomalous situations which may arise during operation owing to causes such as previously mentioned last for a certain time. It will thus be understood that to send systematically a long pulse following each short pulse which had not stepped the motor would be wasteful of energy and contrary to the purpose at which the invention aims. The period during which long duration pulses are sent to the motor is on the order of five minutes but other values might equally be chosen.

FIG. 2a represents a train of bipolar pulses of small width normally applied to the motor. Pulses 10 have a duration on the order of 4 ms and are furnished each second by generator 1. FIG. 2b shows a train of long pulses 11 having a duration on the order of 6 ms provided by generator 6, such pulses succeeding one another at the rhythm of one per second. For reasons subsequently to be explained the series of long pulses is preceded by two long pulses 12 and 13 alternate polarity the leading edges of which are spaced 40 ms in time. Furthermore the circuit is arranged in order that the leading edge of pulse 13 also arrives 40 ms following the beginning of pulse 10. When the position detector determines the arrival of an inverted accidental pulse the feed signal is then as shown in FIG. 2c wherein the train of long pulses is applied to the motor during 5 minutes, following which the motor is once again switched over to the short pulses 10.

FIG. 3a represents the value of couples C which act on the rotor as function of its rotation angle $\alpha$. As is well known the rotor of a stepping motor is subjected to two types of couples: a statique retaining couple $C_a$ due to the magnet alone and the dynamic motor couple $C_{ab}$ due to the interaction of the flux of the magnet with the flux of the winding whenever the latter is energised. Initially the rotor is in position $S_1$. If an advancing pulse of correct polarity is applied to the motor its rotor will be brought from the stable equilibrium position $S_1$ to the position D with the aid of the mutual couple $C_{ab}$ created by said pulse, the remaining portion of the travel (from D to the second stable equilibrium position $S_2$) being brought about thanks to the kinetic energy and the stored potential energy. At the instant of the pulse cut-off (which has lasted 4 ms in the present version) the rotor will be found at point D and will have a certain angular velocity $\Omega_D$ (in a first example of the motor with two steps per revolution $\Omega_D$ has been measured with a velocity of approximately 400 rad/s and for a second example having 8 steps per revolution a velocity has been measured of about 100 rad/s) and the coupling factor defined by $C_{ab}/i$ is approximately at its maximum. It follows that if the voltage induced in the motor winding is measured almost immediately following the pulse cut-off the winding then being open circuited, there will appear at the terminals the product:

$$U_i = \Omega \cdot C_{ab}/i$$

In practice and according to the type of motor this voltage is on the order of 0.4 to 1.2 volts.

FIG. 4 enables a better understanding of the evolution of the different variables as a function of time when the motor responds to a pulse directed in the correct sense. The time abcissa is divided into 4 zones $T_1$ to $T_4$. During time $T_1$ the motor is fed by the control pulse which launches the rotor movement. During time $T_3$ the motor circuit is open which enables on one hand measurement of the induced rotational voltage as will be seen further on, and on the other hand enables the rotor to complete its trajectory without the appearance of a braking couple due to the induced current which would appear if the winding were short-circuited. During time $T_4$ which begins at the end of time $T_3$ and continues until the arrival of a new motor pulse the motor winding is short-circuited, this with the purpose of terminating the rotor movement at the end of the step. In a variant of the invention which will be described later there is provided a further time $T_2$ located between times $T_1$ and $T_3$ when the motor is also short-circuited. The curve $\alpha$ gives the angular position of the rotor and shows that there is under-consideration a motor having two steps per revolution and that the new stable position (180°) is attained following a time of 20 ms. The curve $\Omega$ gives the angular velocity of the rotor which almost immediately following cut-off of the pulse (t after 4 ms) is about 350 rad/s. Curve U gives the value of the feed voltage (1.5 volts) during the control pulse within the time $T_1$. During time $T_3$ the voltage induced at the terminals of the winding takes the form of the curve $U_i$. If this voltage is measured almost immediately at the beginning of time $T_3$ ($T_3=0.2$ ms for example) a large amplitude voltage on the order of 1 volt will be obtained. Finally curve i gives the evolution of the current in the winding which is 0 during time $T_3$ since the winding is then in an open circuit.

It will now be supposed that for one reason or another (sudden increase in the load for instance) the motor has failed to step in response to a correct advancing pulse. There is what may be referred to as an inverted accidental pulse which will then be presented at the terminals of the winding.

Figure 3B:
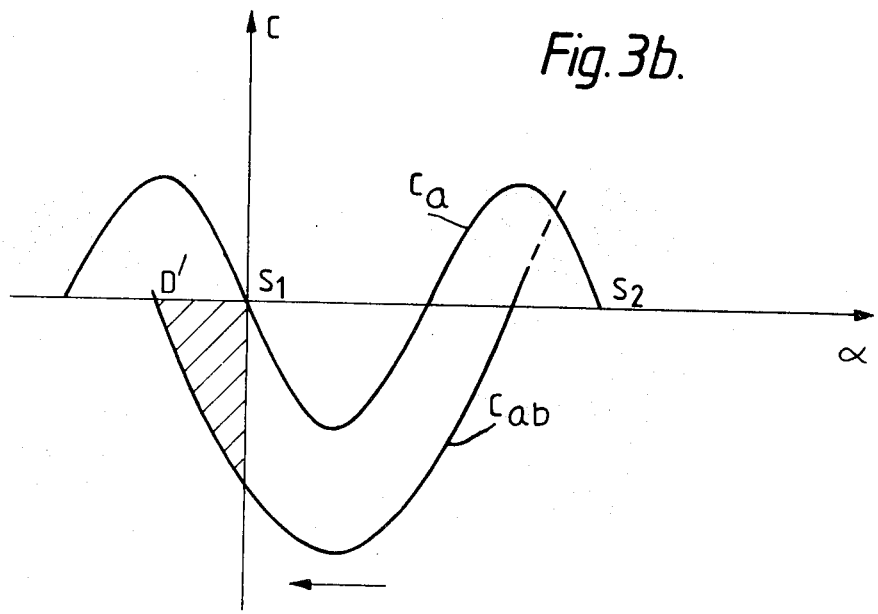

FIG. 3 illustrates this new situation where the mutual couple $C_{ab}$ is to be taken in the inverted sense responsive to an inverted pulse. With this false pulse the rotor is urged in the reverse direction and tends to be stabilised in the neighbourhood of point D'. The energy developed by couple $C_{ab}$ being insufficient to overcome the positioning energy created by couple $C_a$, the rotor will return to its starting point $S_1$. At the moment that the current is cut-off the angular velocity $\Omega$ and the coupling factor $C_{ab}/i$ are practically 0 and hence the induced voltage $U_i$ obtained is equally almost 0.

Figure 5:
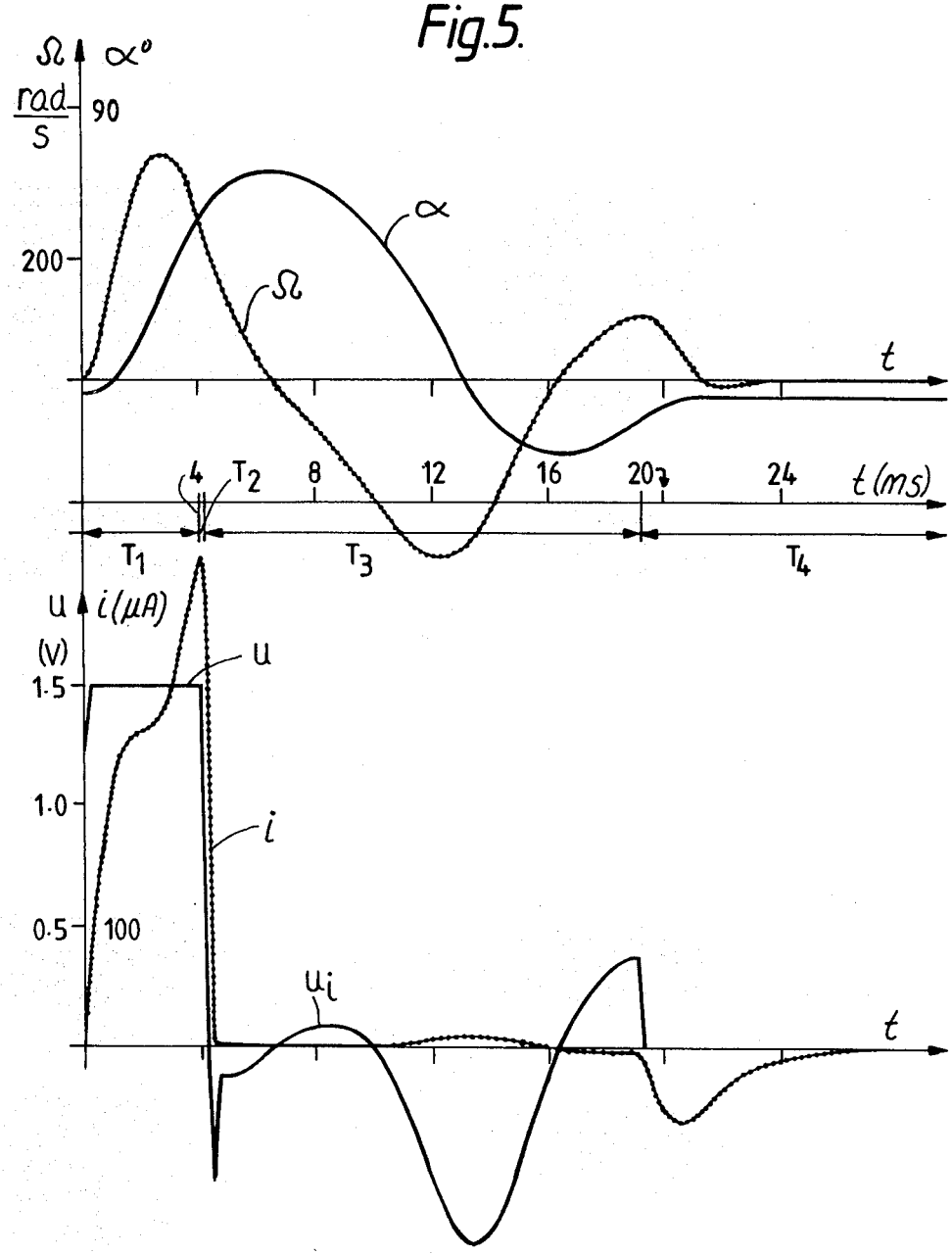
FIG. 5 shows the same variables as FIG. 4 when the motor has received an accidental inverted pulse.

FIG. 5 shows the evolution of the different variables as a function of time when the motor responds to an inverted accidental pulse or a bad pulse and this under the same conditions of load as that of FIG. 4. More particularly here will be observed the value of the induced voltage at the beginning of time $T_3$. Should this voltage be measured almost immediately at the beginning of time $T_3$ (at $T_3=0.2$ ms for instance) there will be obtained a negative voltage of small amplitude on the order of 0.1 volt.

A comparison of the situations presented by FIGS. 4 and 5 shows immediately that thanks to the measurement of the induced voltage $U_i$ obtained at the terminals of the motor winding one may determine if the motor has received a normal correct pulse or on the contrary an incorrect inverted pulse, the first delivering a large amplitude voltage and the second a voltage almost zero or even negative. Concerning a motor with bipolar feeding and in the case when the motor receives a correct advance pulse it may be supposed that it has stepped with the preceding pulse and thus that it may continue to be fed by short duration pulses such as those shown in FIG. 2a. In the contrary example where the motor receives a false pulse it may be deduced that the rotor has not stepped with the preceding pulse and moreover in fact that it will not step if a new pulse is presented, this latter being also shown as false. It will thus be necessary to recover the two lost steps, this explaining the presence in FIG. 2b of two closely spaced pulses of greater width 13 and 12. In a variant of the invention the leading edges of these alternating pulses of greater width are spaced apart 40 ms, the leading edge of pulse 40 also beginning 40 ms following the last pulse of short duration 10. Other times may be chosen for locating these two alternating pulses 13 and 12 provided that they take place between the last short pulse 10 and the first long pulse 11 which themselves are spaced one second apart.

As already mentioned above, in a variant of the invention a time $T_2$ during which the winding is short-circuited is interposed between times $T_1$ and $T_3$. This time lapse may be advantageous for two reasons: initially to recover the energy from the self induction $L \cdot i^2/2$ contained in the circuit and then to limit the survoltage arising at the terminals of the winding.

Figure 6:
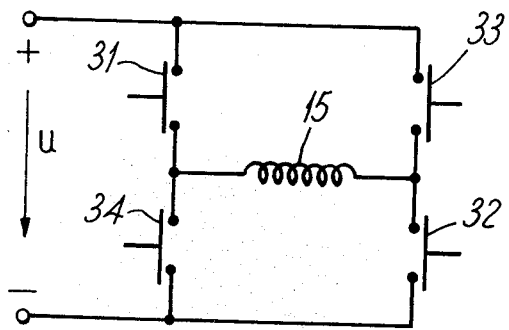
FIG. 6 shows how the motor is connected to the source voltage.

FIG. 6 shows how winding 15 of the motor is connected to the source voltage U. In this schematic the motor receives atlernate pulses when switches 31-32 or respectively 33-34 are closed. The two following tables indicate positions of switches 31 to 34 according to the time periods $T_1$ to $T_4$ defined above and in accordance with the invention. The control sequence for the switches is determined thus according to whether it concerns (a) a positive pulse

| TIME | SWITCHES | | | |
|---|---|---|---|---|
| | 31 | 32 | 33 | 34 |
| $T_1$ (= 4 ms) | closed | closed | open | open |
| $T_2$ (= 0,2 ms) | closed | open | closed | open |
| $T_3$ (= 15 ms) | open | open | open | open |
| $T_4$ (= 980,8 ms) | closed | open | closed | open |

(b) a negative pulse

| TIME | SWITCHES | | | |
|---|---|---|---|---|
| | 31 | 32 | 33 | 34 |
| $T_1$ (= 4 ms) | open | open | closed | closed |
| $T_2$ (= 0,2 ms) | closed | open | closed | open |
| $T_3$ (= 15 ms) | open | open | open | open |
| $T_4$ (= 980,8 ms) | closed open | closed | open | |

It is obvious that in present techniques transistors are used as switches. Moreover the value of times $T_1$ to $T_4$ are given as indications and are suitable for a certain motor constructions. Other values could be chosen without departing from the object of the invention.

Figure 7:
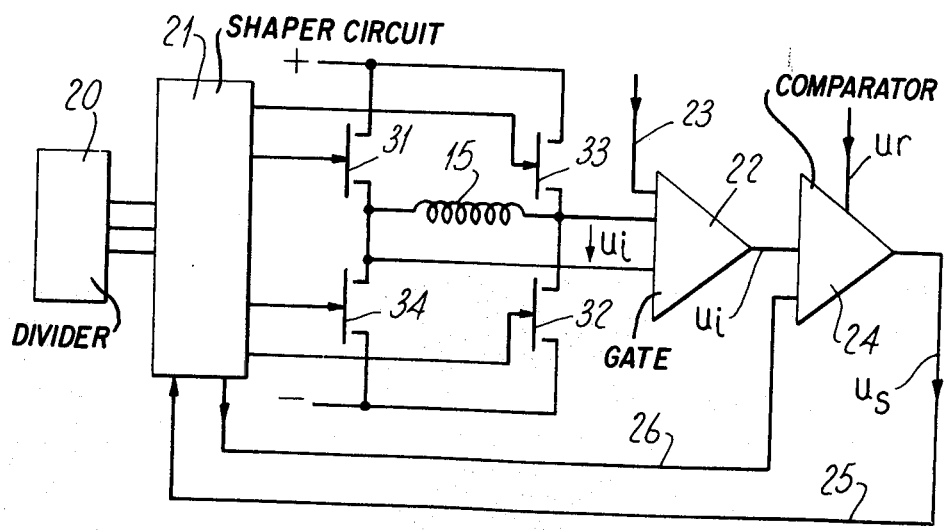
FIG. 7 shows a possible theoretical arrangement for utilizing the invention.

FIG. 7 shows a schematic block diagram which could possibly be employed for an application of the invention.

Signals coming from the divider circuit 20 are applied to a shaping circuit 21. This latter includes a short pulse generator 1, along with pulse generator 6 and a counter 7, as has been explained in FIG. 1. Control electrodes of transistors 31 to 34 are subjected to signals such as shown in FIG. 2a according to the sequences shown in the above tables or by signals as shown if FIG. 2c according to whether the motor pulse is considered correct or incorrect. The voltage across the terminals of winding 15 is coupled to the input of the circuit 22. A clock signal 23 coming from the frequency divider is likewise connected to the input of circuit 22. This latter signal which may last several microseconds opens circuit 22 following each short pulse, that is to say in a preferred version of the invention approximately 0.2 ms following the beginning of time $T_3$. During this short instant there appears thus at the output of circuit 22 the induced voltage $U_i$ as has been explained above and in conformity with FIGS. 4 and 5. The voltage $U_i$ is compared with a reference voltage $U_r$, in a comparator 24. If $U_i$ should be greater than $U_r$ then a correct advancing pulse has been applied to the motor and no signal appears at the output of the comparator: the control circuit continues to emit short duration pulses. If to the contrary $U_i$ is smaller than $U_r$ then an accidental inverted pulse has been applied to the motor and there will appear a signal $U_s$ at the output of the comparator which via line 25 conditions the control circuit to deliver a train of long pulses as has been shown in FIG. 2c. During the time that these long pulses are delivered the comparator 24 is blocked by line 26.

Measures made on a model have shown that taking into account the various circumstances which may arise the difference between the voltage $U_i$ produced by a correct pulse and the voltage $U_i$ produced by an incorrect pulse is very large. It results therefrom that the proposed method is very reliable if the reference voltage $U_r$ is chosen in limits sufficiently great thereby simplifying the realisation of comparator 24.

Finally as already mentioned the method has as its purpose to limit consumption of energy of a timepiece by measuring the induced voltage which may be picked up at the motor terminals, this latter being then open circuited. Such method may thus be adapted to any stepping motor system. With a motor having parameters as suggested herein energy savings on the order of 60% have been measured.

What I claim is:

1. A feed method for a single phase timepiece stepping motor adapted to control the operation of the motor by applying thereof either a first type of bipolar pulses of relatively small width or a second type of bipolar pulses of greater width, successive pulses whether of the first or second type being separated by the same predetermined time interval and a sequence of pulses of the second type being applied whenever the motor receives a pulse of a polarity to oppose stepping during application of pulses of the first type, wherein following each pulse of the first type occupying first time period $T_1$, the motor is open circuited during a second time period $T_3$, at the beginning of which voltage $U_i$ induced by the motor is measured, applying said sequence of pulses of the second type to said motor when said induced voltage is less than a predetermined value, said sequence beginning following said predetermined time interval after the last pulse of the first type and two alternate polarity pulses of greater width being interposed between said last pulse and the first pulse of said sequence, the first of said two pulses being of a polarity inverted from that of said last pulse.

2. A feed method as set forth in claim 1 wherein said predetermined time interval is one second.

3. A feed method as set forth in claim 1 wherein the motor is short circuited during a time period $T_2$ located between the first time period $T_1$ and the second time period $T_3$ and during a time period $T_4$ located between the second time period $T_3$ and the arrival of the next motor pulse and wherein the time periods $T_1$ to $T_3$ lie in the respective ranges $T_1$ 2 ms–6 ms; $T_2$ 0.1 ms–0.5 ms; $T_3$ 5 ms–18 ms and that the induced motor voltage $U_i$ is measured during a period of 0.1 ms–0.3 ms following beginning of the second time period $T_3$.

4. A feed method as set forth in claim 1 wherein the induced motor voltage $U_i$ is compared with a reference voltage $U_r$, the comparison result voltage $U_s$ starting the feeding of the motor by the second type of pulses if said comparison result voltage is other than zero.

5. An electronic timepiece comprising time indicating means actuated by a stepping electric motor normally driven to advance in steps in response to the application thereto of periodic normal driving pulses of successively opposite polarities; detecting circuit for detecting after a driving pulse has been applied to the motor, whether the motor is in the condition of rotation or in the condition of non-rotation; and means, operated when the response of the detecting circuit is that appropriate to the condition of non-rotation, for applying to the motor two successive correction driving pulses of successively opposite polarities and each of greater width than that of a normal driving pulse, the first of these correction driving pulses being of opposite polarity to the immediately preceding normal driving pulse.

* * * * *